(12) United States Patent
Bochen et al.

(10) Patent No.: US 8,286,545 B2
(45) Date of Patent: Oct. 16, 2012

(54) PISTON-CYLINDER UNIT (75) Inventors: Marian Bochen, Eitelborn (DE); Thomas Ehre, Koblenz (DE)

(73) Assignee: Stabilus GmbH, Koblenz (DE)

( * ) Notice: Subject to any disclaimer, the term of this patent is extended or adjusted under 35 U.S.C. 154(b) by 689 days.

(21) Appl. No.: 12/354,145

(22) Filed: Jan. 15, 2009

(65) Prior Publication Data

US 2009/0178554 A1    Jul. 16, 2009

(30) Foreign Application Priority Data

Jan. 16, 2008 (DE) .......................... 10 2008 004 734
Feb. 7, 2008 (DE) .......................... 10 2008 008 295
Feb. 20, 2008 (DE) .......................... 10 2008 010 247

(51) Int. Cl.
*F01B 31/12* (2006.01)
(52) U.S. Cl. ......................................... 92/5 R
(58) Field of Classification Search ............... 92/5 R; 91/1
See application file for complete search history.

(56) References Cited

U.S. PATENT DOCUMENTS 5,233,293 A *   8/1993   Huang et al. .................. 92/5 R
7,650,828 B2 *  1/2010   Rau et al. ...................... 92/5 R

FOREIGN PATENT DOCUMENTS

WO    WO 2006105828 A1 *  10/2006

* cited by examiner

*Primary Examiner* — Michael Leslie
(74) *Attorney, Agent, or Firm* — Cozen O'Connor (57) ABSTRACT A piston-cylinder unit for pivoting a flap with respect to a motor vehicle body includes a cylinder having an open end with a seal, a closed end, and an interior space between the ends; a piston unit axially movable in the cylinder, the piston unit dividing the interior space into a first working space and a second working space; a piston rod connected to the piston unit and extending through the first working space and the seal; and flow connections connecting the first working space to the second working space. A switch element arranged outside the cylinder is switched in response to movement of the piston with respect to the cylinder.

14 Claims, 8 Drawing Sheets

PISTON-CYLINDER UNIT

BACKGROUND OF THE INVENTION

1. Field of the Invention

The invention pertains to a piston-cylinder unit for a pivotable flap or folding hardtop, especially for motor vehicles, with a fluid-filled cylinder in which a piston installed with freedom to slide back and forth divides the interior space into a first working space and a second working space and a piston rod extends axially through the first working space and projects to the outside through a seal.

2. Description of the Related Art

In the most general sense, these types of piston-cylinder units are known as hydraulic, pneumatic, or hydropneumatic adjusting elements such as gas springs, dampers, or hydraulic or pneumatic cylinders. Nevertheless, there is a steadily increasing demand for devices of this type which include means for detecting the position of the pivotable components.

SUMMARY OF THE INVENTION

According to the invention, a switch contact actuated by movable parts of the piston-cylinder unit is provided outside the cylinder.

It has been found to be especially favorable for the switch element to be designed as a reed contact, as a Hall sensor, or as a coil body.

In an advantageous embodiment, a magnet, the magnetic field of which excites the switch element, is provided in the piston.

So that the switch contact can be actuated reliably, the magnet is designed as a ring-shaped disk. This also simplifies the assembly process, because there is no need to worry about the orientation of the piston in the cylinder.

According to a variant of the invention, the magnet is provided outside the cylinder, preferably near the switch element.

It has as been found to be especially favorable with respect to the assembly process for the magnet and the switch contact to be premounted on a carrier. As a result, the correct distance between the two components is reliably maintained during the assembly process.

According to another design variant, the switch contact and the magnet form an encapsulated unit, as a result of which the components are protected against contamination.

In yet another operationally reliable design, a heat-shrink tube extends over the cylinder, the switch element, and the magnet.

The cylinder is made of a nonferromagnetic material, so that the field lines of the magnet are not significantly perturbed and the device functions reliably.

In an alternative inventive design, a cover tube is mounted on the end of the piston rod facing away from the piston. As a result, a ferromagnetic material can also be used for the cylinder.

In this variant, it is preferable for the magnet to be located externally on the cover tube near the switch contact, where the switch contact and the magnet form an encapsulated unit and/or a heat-shrink tube extends over the cover tube, the switch contact, and the magnet.

Alternatively, the magnet and the switch contact can be embedded in the cover tube.

Alternatively, another magnet or a coil body can be located on an outside surface of the cylinder.

Exemplary embodiments of the invention are illustrated in the drawing and are explained in greater detail below:

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
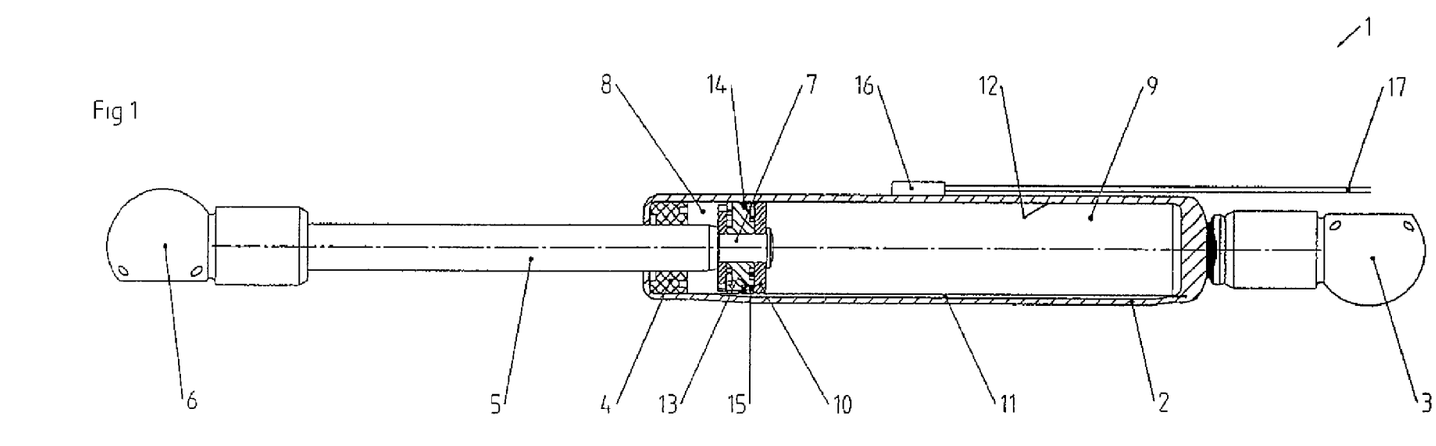
FIGS. 1 and 2 show a first exemplary embodiment of an inventive piston-cylinder unit in two positions.
Figure 2:
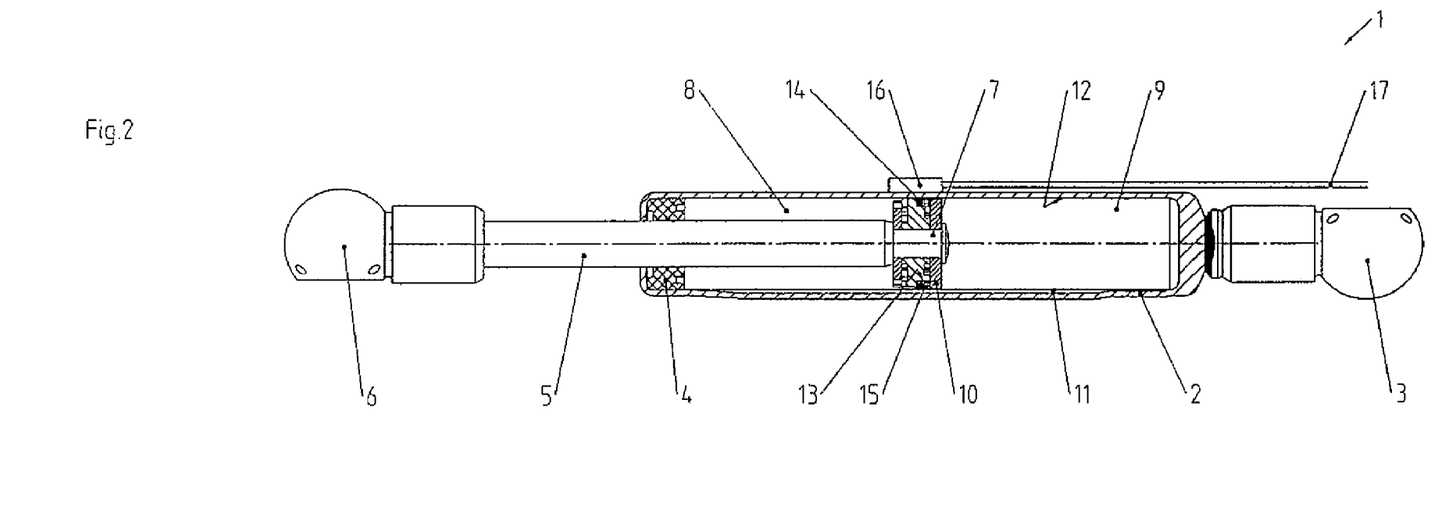

FIGS. 1 and 2 show longitudinal cross sections through a piston-cylinder unit 1, designed as a gas spring or damper, with a cylinder 2, which is closed off at one end by a first connecting device 3. At the open end of the cylinder 2 opposite the first connecting device 3, a sealing and guide package 4 is provided, by means of which a piston rod 5 is sealed and guided to the outside with freedom of axial movement, where a second connecting device 6 is located on the outward-projecting end of the piston rod 5. The connecting devices 3 and 6 are designed as, for example, hinge eyes or, as illustrated here, ball sockets, by means of which the piston-cylinder unit 1 can be connected at one end to a stationary component (also not shown), such as a vehicle body, and at the other end to a pivoting part, e.g., a flap or trunk lid, which can pivot relative to the stationary component.

Figure 3:
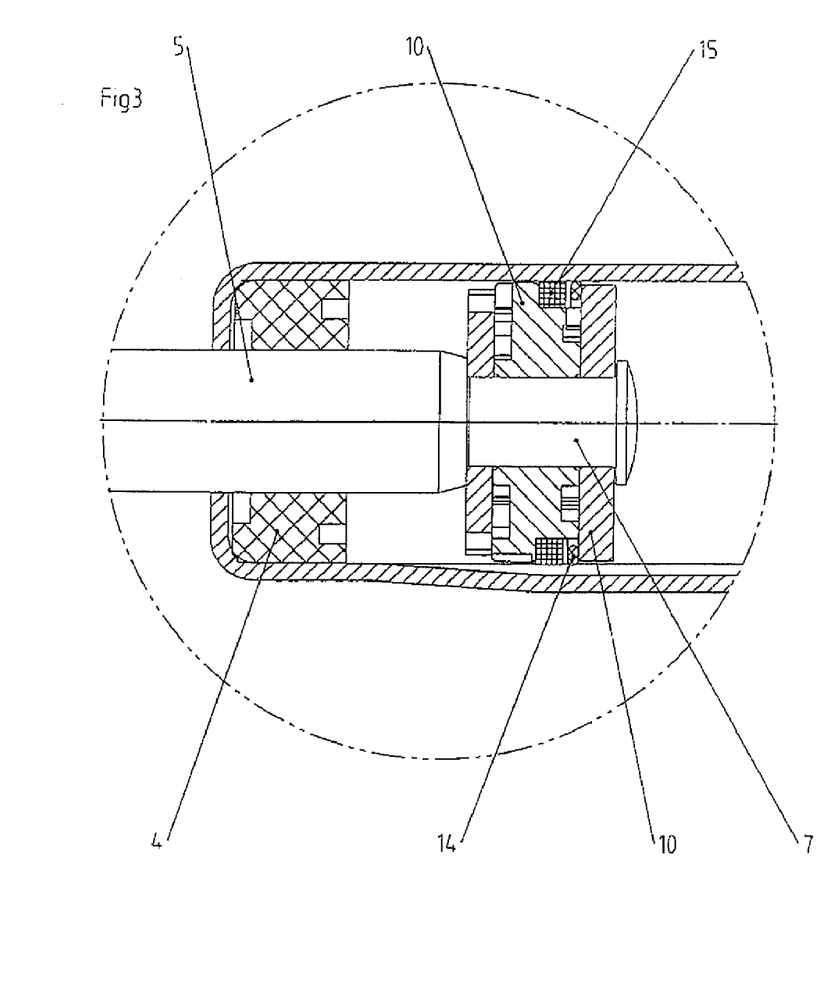
FIG. 3 is a detailed cross-section of the piston and seal illustrated in FIGS. 1 and 2.

At the end of the piston rod 5 opposite the second connecting device 6, a journal 7 of smaller diameter, which thus creates a shoulder on the piston rod 5, is formed, on which a piston package, called the piston 10 in the following is mounted. This piston divides the cylinder 2 into a first working space 8 on the piston rod side and a second working space 9 on the side opposite the piston rod 5. The piston 10, which is shown in detail in FIG. 3, can have flow connections, through which a fluid, preferably oil or pressurized gas in the form of nitrogen, can flow from the first working space 8 to the second working space 9 and vice versa. Another flow connection can be provided by a groove 11 extending axially along the cylinder 2.

The piston 10 also has a piston groove 13 in the lateral surface facing the inside wall 12 of the cylinder 2. A sealing ring 14 and an annular disk-shaped magnet 15 are provided in this groove. A switch element 16 is arranged on the outside surface of the cylinder 2. The switch element 16 is designed as a reed contact with an opener, closer, or changeover function, for example, or as a Hall sensor, and it is connected by conducting wires 17 to components of the on-board electronics (not shown). It is also possible for the switch element 16 to be designed as a coil body. The ends of the coil body would then be connected by the wires 17 to the on-board electronics.

By the closing of the flap, the piston rod 5 is pushed together with the piston 10 into the cylinder 2, whereby the first working space 8 becomes larger and the second working space 9 smaller, and the magnet 15 arrives in the vicinity of the switch element 16, as shown in FIG. 2. The magnetic field of the magnet 15 passes through the cylinder 2, which is made of nonmagnetizable or nonferromagnetic material such as aluminum or stainless steel. The switch element 16 switches, and an electrical signal is received at a suitable point of the on-board electronics and evaluated.

When the piston 10 and the piston rod 5 move even farther into the cylinder 2 and the magnet 15 thus moves away from the switch element 16, the switch element 16 switches again. The same functions occur again, of course, when the (hinged) lid is opened from the closed position into the open position. It would be advisable to arrange several switch elements 16 along the cylinder 2 to detect various positions of the piston 10.

Figure 4:
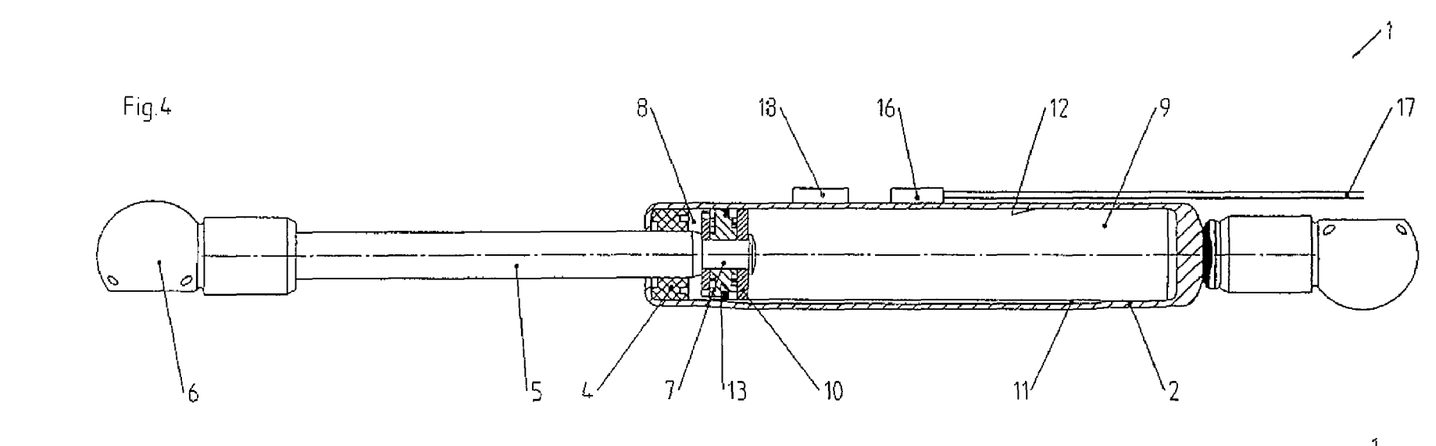
FIGS. 4 and 5 show a second exemplary embodiment of an inventive piston-cylinder unit in two positions.
Figure 5:
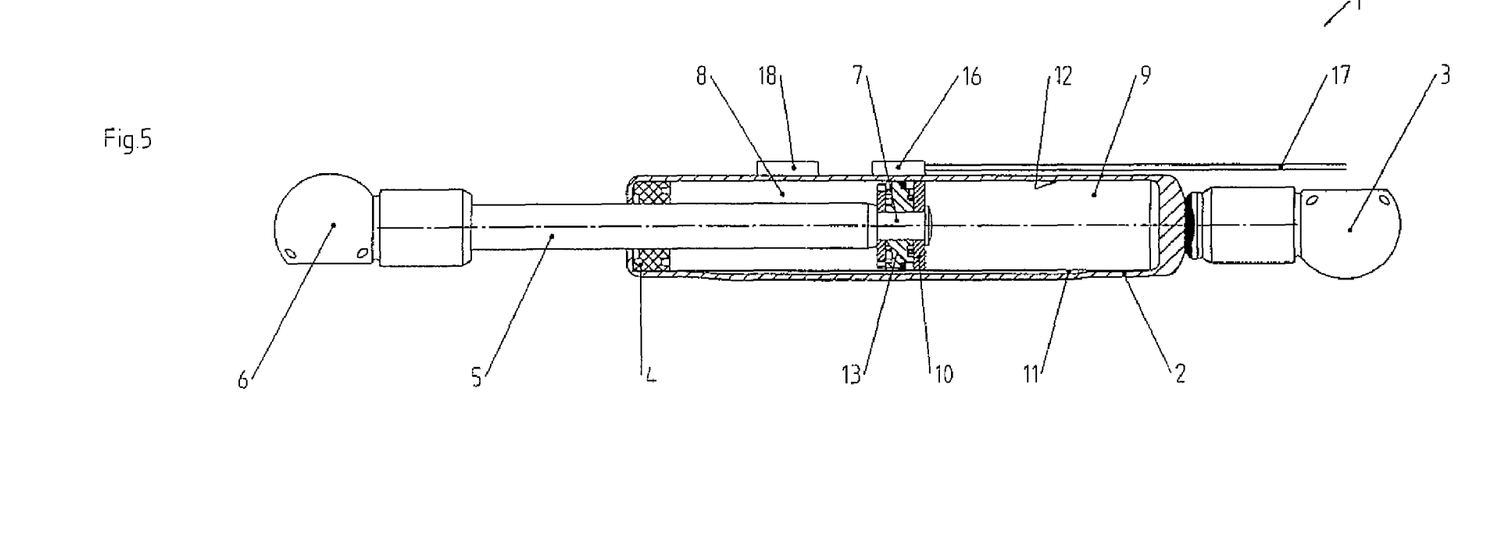

FIGS. 4 and 5 show another inventive embodiment, in which a magnet 18 is arranged on the outside surface of the cylinder 2, consisting preferably of aluminum, near the switch element 16. The expert will understand that an arrangement of magnet 18 and switch element 16 of this type will involve a biased reed contact or a biased Hall sensor. The switch element 16 can also be designed as a coil body.

As a result of the movement of the piston 10, which is made of ferromagnetic material, from the position shown in FIG. 4, for example, to the position shown in FIG. 5, the magnetic field of the magnet 18 is altered by the piston 10 in such a way that the switch element 16 is excited and therefore switches. An electrical signal is thus transmitted via the conducting wires 17 to a suitable component of the on-board electronics for evaluation.

Figure 6:
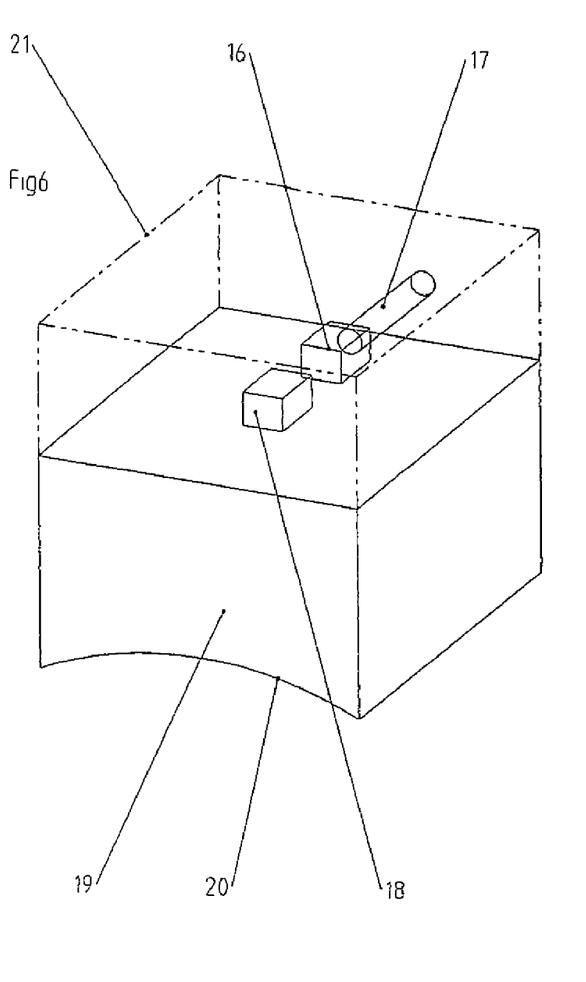
FIG. 6 is a schematic perspective of the switching assembly illustrated in FIGS. 4 and 5.

As FIG. 6 shows, the switch element 16 and the magnet 18 are premounted on a carrier 19. As a result, the precision of their arrangement with respect to each other can be realized with a high degree of process reliability and low tolerances. On the side opposite the switch element 16, the carrier 19 has a curved surface 20, which has essentially the same radius as the cylinder 2. A cover 21, which covers the switch element 16 and the magnet 18, is shown in phantom in the figure. This cover is permanently connected to the carrier 19 to form an encapsulated unit. The carrier 19 can then be fixed to the cylinder 2 by suitable means such as an adhesive.

Figure 7:
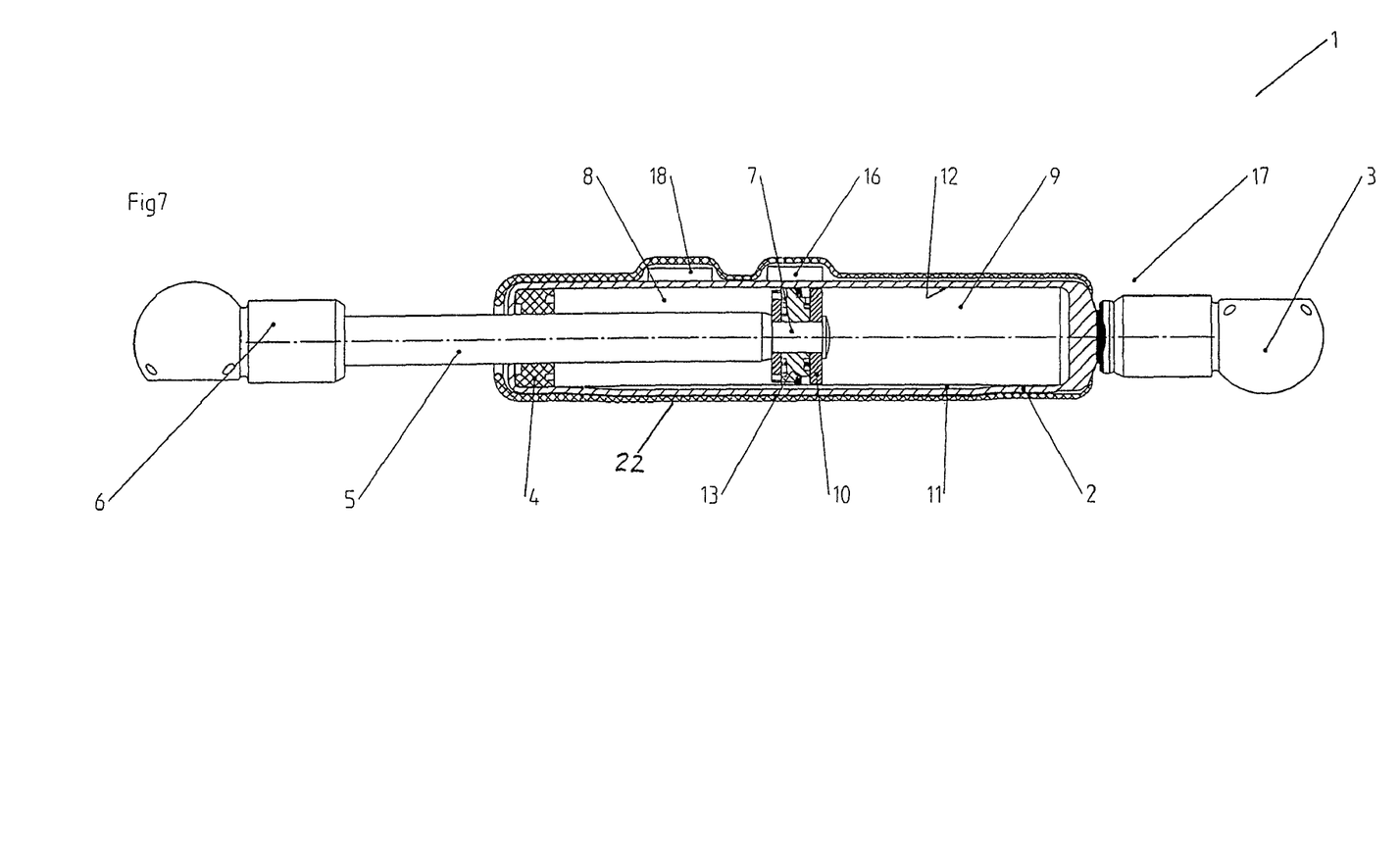
FIG. 7 shows a variant of the piston-cylinder shown in FIGS. 4 and 5.

FIG. 7 shows a variation of the embodiment in FIGS. 4 and 5. Switch element 16 and magnet 18, arranged together on the carrier 19 shown in FIG. 6 with or without the cover 21 or a thin support film (not shown), can be mounted on the cylinder 2 and covered by a heat-shrink tube 22, which extends essentially over the entire cylinder 2.

Figure 8:
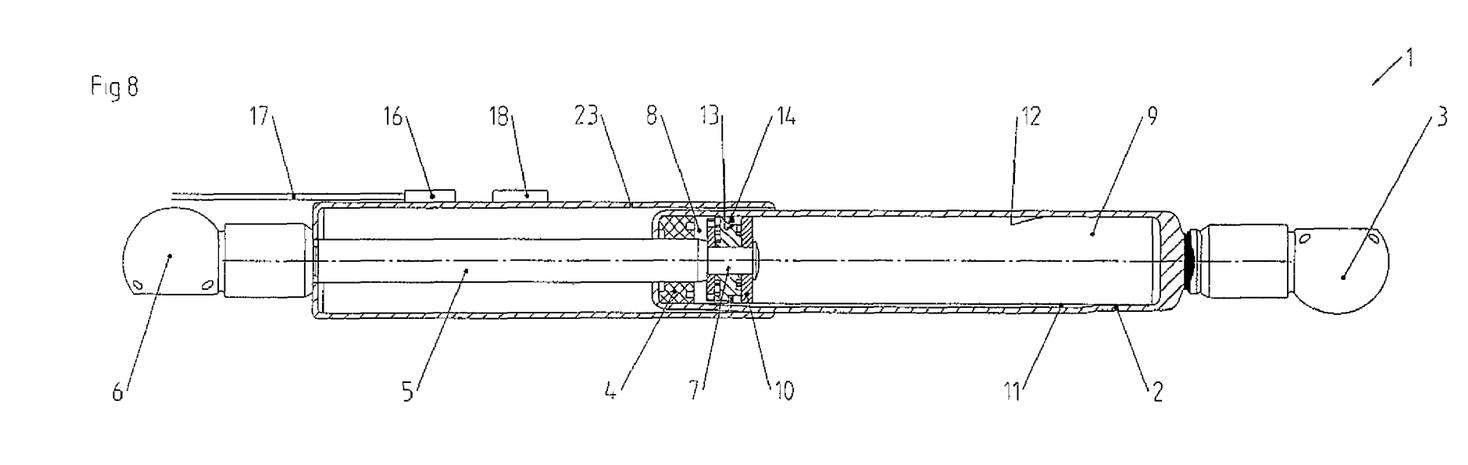
FIGS. 8 and 9 show a third exemplary embodiment of an inventive piston-cylinder unit.
Figure 9:
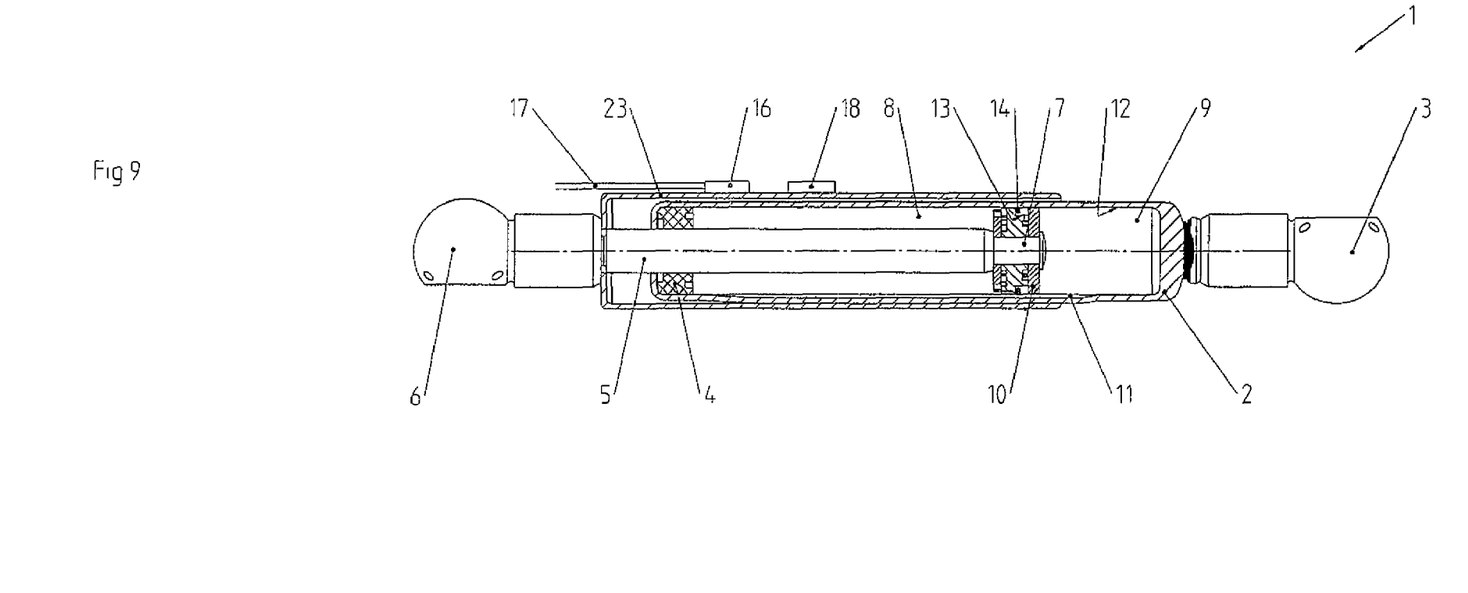

In FIGS. 8 and 9, a cover tube 23, closed at one end, is attached to the end of the piston rod 5 opposite the piston 10. When the piston rod is in its outward-extended position, as FIG. 7 shows, the open end of the cover tube 23 still covers a small part of the cylinder, so that it is still possible for the cover tube 23 to be guided on the outside surface of the cylinder 2. The switch element 16 and the magnet 18 are arranged on the outside surface of the cover tube 23, where the cover tube 23 consists of a nonmagnetizable material, preferably plastic. The two components 16 and 18 can be attached in the manner previously described in conjunction with FIGS. 3-6. It would also be possible for the two components to be incorporated into or embedded in the cover tube 23 by injection molding or attached to it by means of latching devices.

As a result of the movement of the piston rod 5 from the position shown in FIG. 8, for example, to the position shown in FIG. 9, the end of the cylinder 2 opposite the first connecting device 3 arrives in the area of the switch element 16. As a result, the cylinder 2, which in this case is made of ferromagnetic material, changes the magnetic field of the magnet 18 in such a way that the switch element 16 is excited and therefore switches. An electrical signal can therefore be transmitted via wires 17 to a suitable component of on-board electronics for evaluation.

Figure 10:
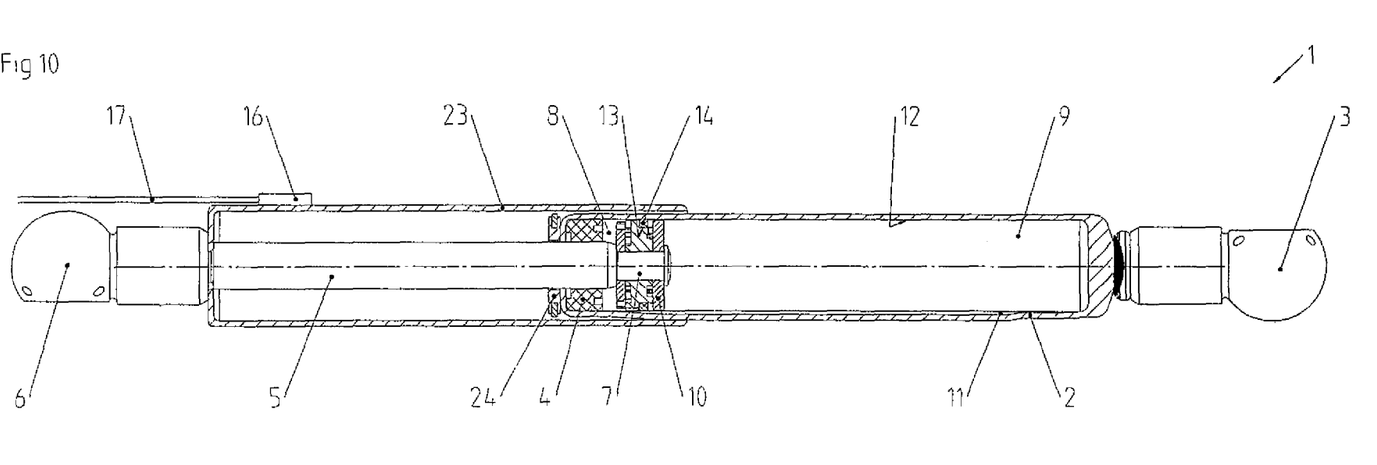
FIGS. 10 and 11 show a fourth exemplary embodiment of an inventive piston-cylinder unit.
Figure 11:
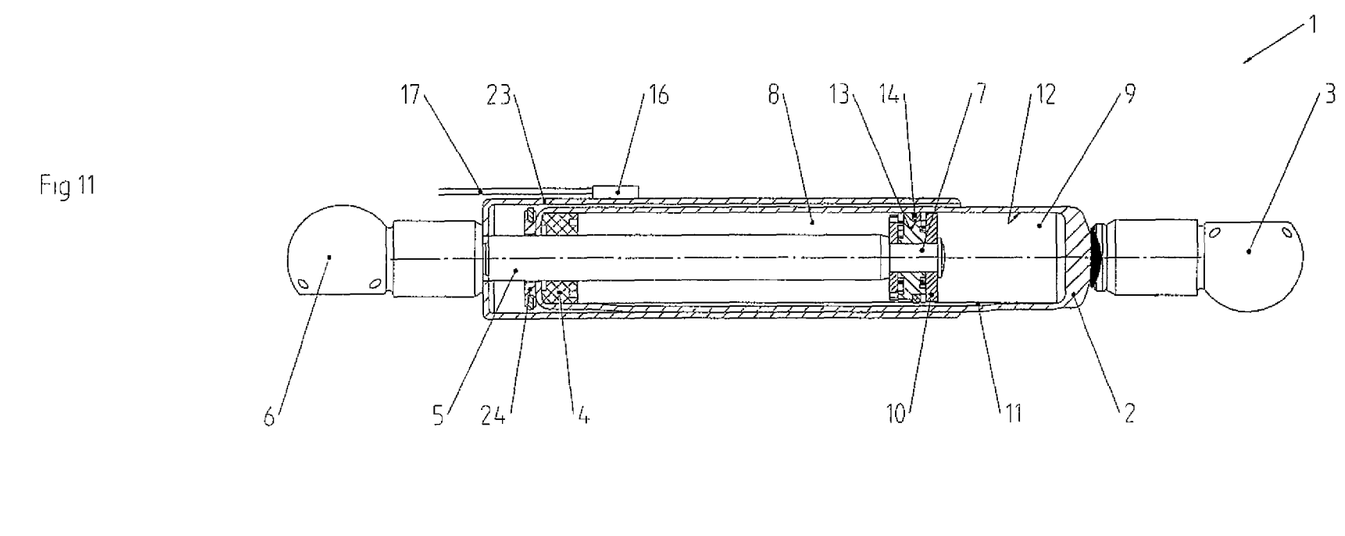

In FIGS. 10 and 11, the magnets 18 appearing in FIGS. 8 and 9 have been eliminated. Instead, a magnet 24 is arranged on an outside surface of the cylinder 2. When the cover tube 23 moves together with the switch element 16 to a point near the magnet 24, the switch element 16 is excited and switches. An electrical signal can then again be transmitted via conducting wires 17 to the on-board electronics.

Figure 12:
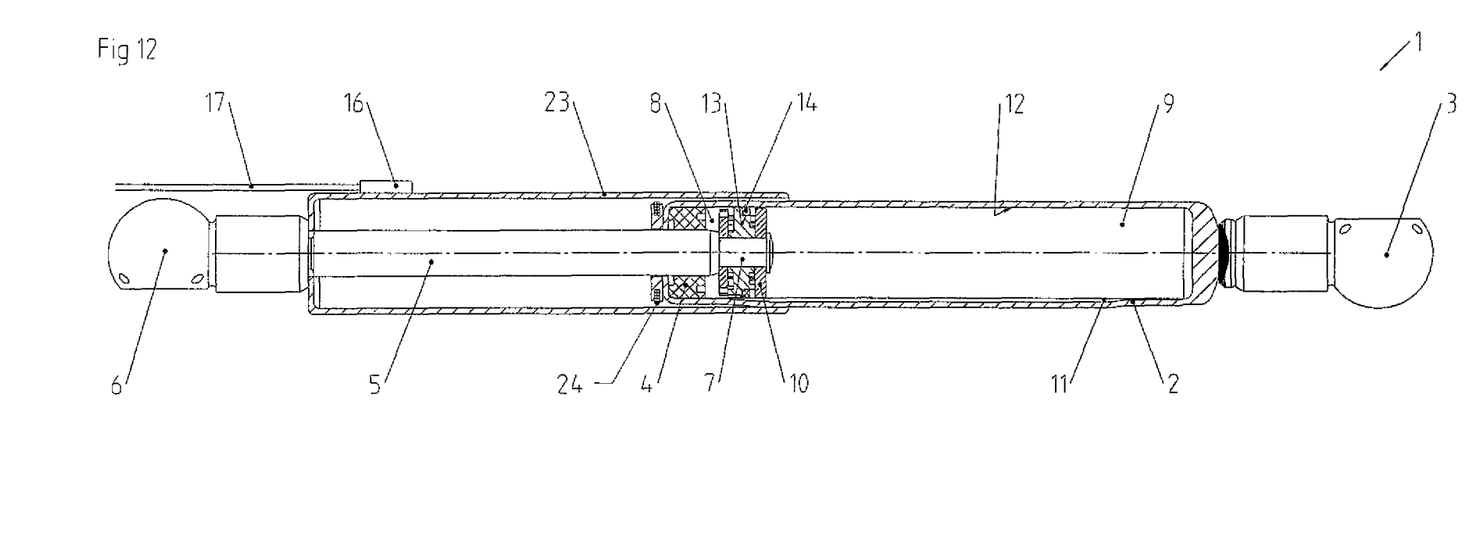
FIG. 12 shows a fifth exemplary embodiment of an inventive piston-cylinder unit.

In FIG. 12, the magnet 24 is replaced by a coil body 24'. The ends of the coil body 24' are connected to the on-board electronics. The use of the coil body 24' is preferably realized in conjunction with a switch element 16 designed as a coil body.

Figure 13:
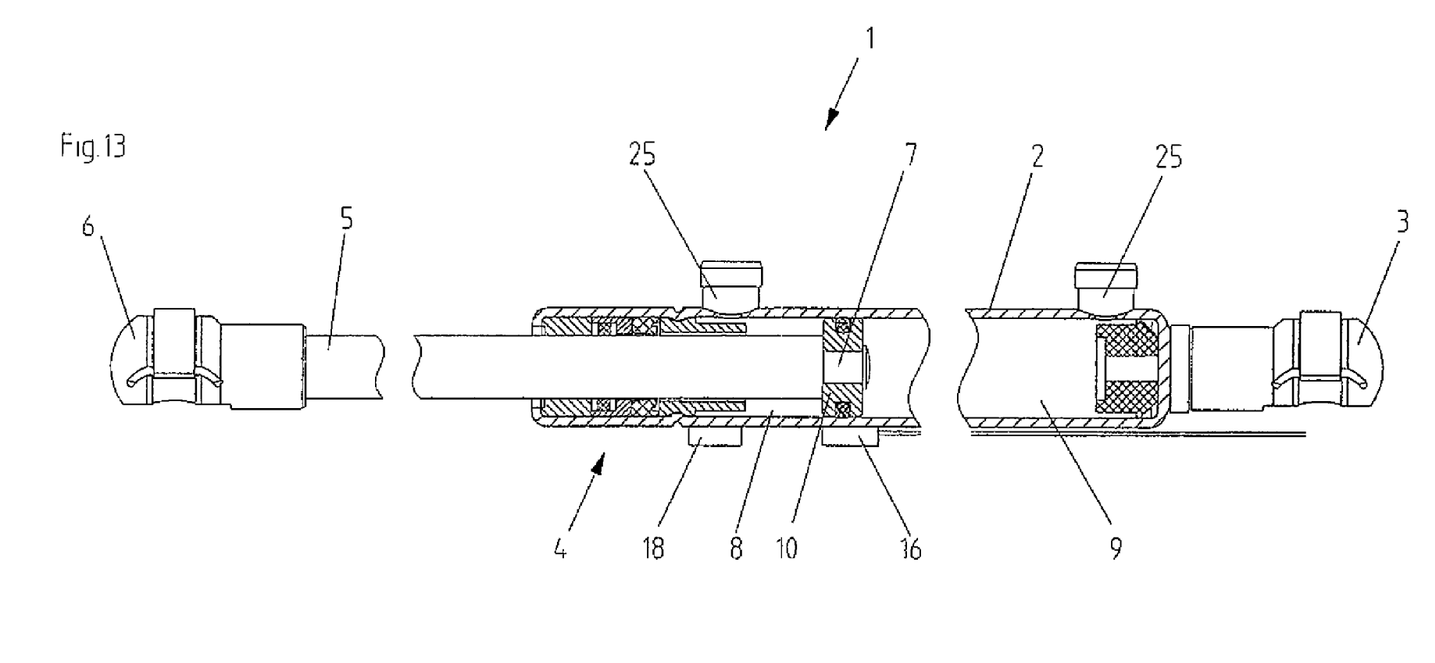
FIG. 13 shows a sixth exemplary embodiment of an inventive piston-cylinder unit.

FIG. 13 shows an adjusting element in the form of a hydraulic or pneumatic cylinder with pressure connection elements 25, the cylinder being provided with, for example, a biased reed contact or biased Hall sensor as in the case of the cylinder shown in FIGS. 4 and 5. A hydraulic or pneumatic cylinder of this type, however, can also be designed in a manner similar to that shown in the other figures.

The invention is not limited by the embodiments described above which are presented as examples only but can be modified in various ways within the scope of protection defined by the appended patent claims.

We claim:

1. A piston-cylinder unit for pivoting a flap with respect to a body, the unit comprising:
   a cylinder having an open end with a seal, a closed end, and an interior space between the ends;
   a piston unit axially movable in the cylinder, the piston unit dividing the interior space into a first working space and a second working space;
   a piston rod connected to the piston unit and extending through the first working space and the seal;
   a switch element arranged outside the cylinder, the switch element switching in response to movement of the piston with respect to the cylinder;
   a magnet arranged outside the cylinder arranged at a fixed distance from the switch element; and
   a carrier on which the magnet and the switch element are mounted.

2. The piston-cylinder unit of claim 1 wherein the switch element comprises a reed contact.

3. The piston-cylinder unit of claim 1 wherein the switch element comprises a Hall sensor.

4. The piston-cylinder unit of claim 1 wherein the switch element comprises a coil body.

5. The piston-cylinder unit of claim 1 wherein the switch element is fixed with respect to the cylinder, the unit further comprising another magnet arranged on the piston, the another magnet having a magnetic field which excites the switch element.

6. The piston-cylinder unit of claim 5 wherein the another magnet comprises a ring-shaped disk.

7. The piston-cylinder unit of claim 1 further comprising a cover fixed to the carrier over the magnet and the switch element to form an encapsulated unit.

8. The piston-cylinder unit of claim 1 further comprising a heat shrink tube extending over the cylinder, the switch element, and the magnet.

9. The piston-cylinder unit of claim 1 wherein the cylinder is a non-ferromagnetic material.

10. The piston-cylinder unit of claim 1 further comprising a cover tube fixed to the piston rod and extending over the open end of the cylinder.

11. The piston-cylinder unit of claim 10 wherein the switch element is fixed on the cover tube, the unit further comprising a magnet arranged on the cover tube at fixed distance from the switch element.

12. The piston-cylinder unit of claim 11 comprising an encapsulated unit enclosing the switch element and the magnet.

13. The piston-cylinder unit of claim 11 further comprising a heat shrink tube extending over the cover tube, the switch element, and the magnet.

14. A piston-cylinder unit for pivoting a flap with respect to a body, the unit comprising:
- a cylinder having an open end with a seal, a closed end, and an interior space between the ends;
- a piston unit axially movable in the cylinder, the piston unit dividing the interior space into a first working space and a second working space;
- a piston rod connected to the piston unit and extending through the first working space and the seal;
- a cover tube fixed to the piston rod and extending over the open end of the cylinder;
- a switch element arranged outside the cylinder, the switch element switching in response to movement of the piston with respect to the cylinder; and
- a magnet arranged outside the cylinder at a fixed distance from the switch element,
wherein the switch element and the magnet are embedded in the cover tube.

* * * * *